UNITED STATES PATENT OFFICE.

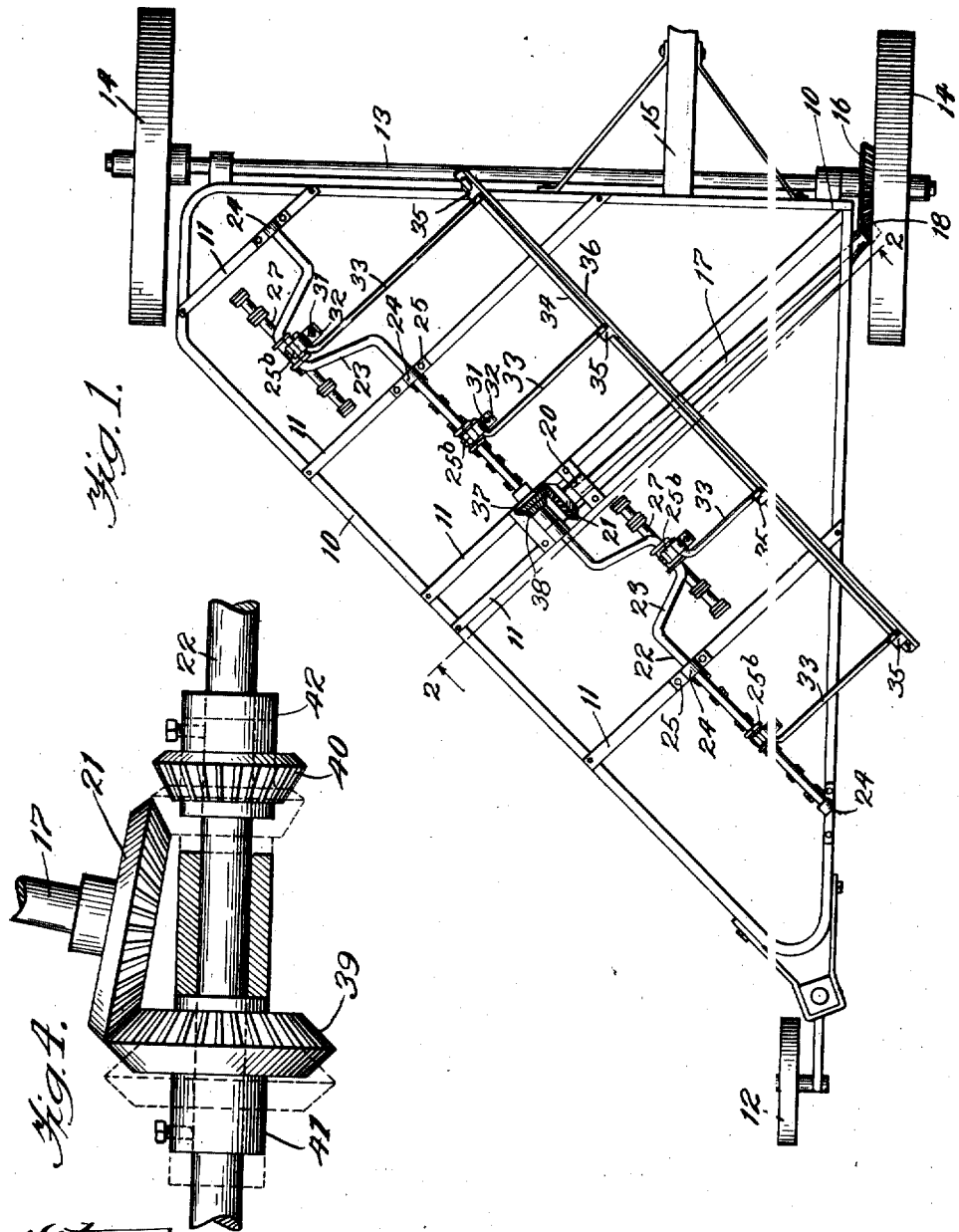

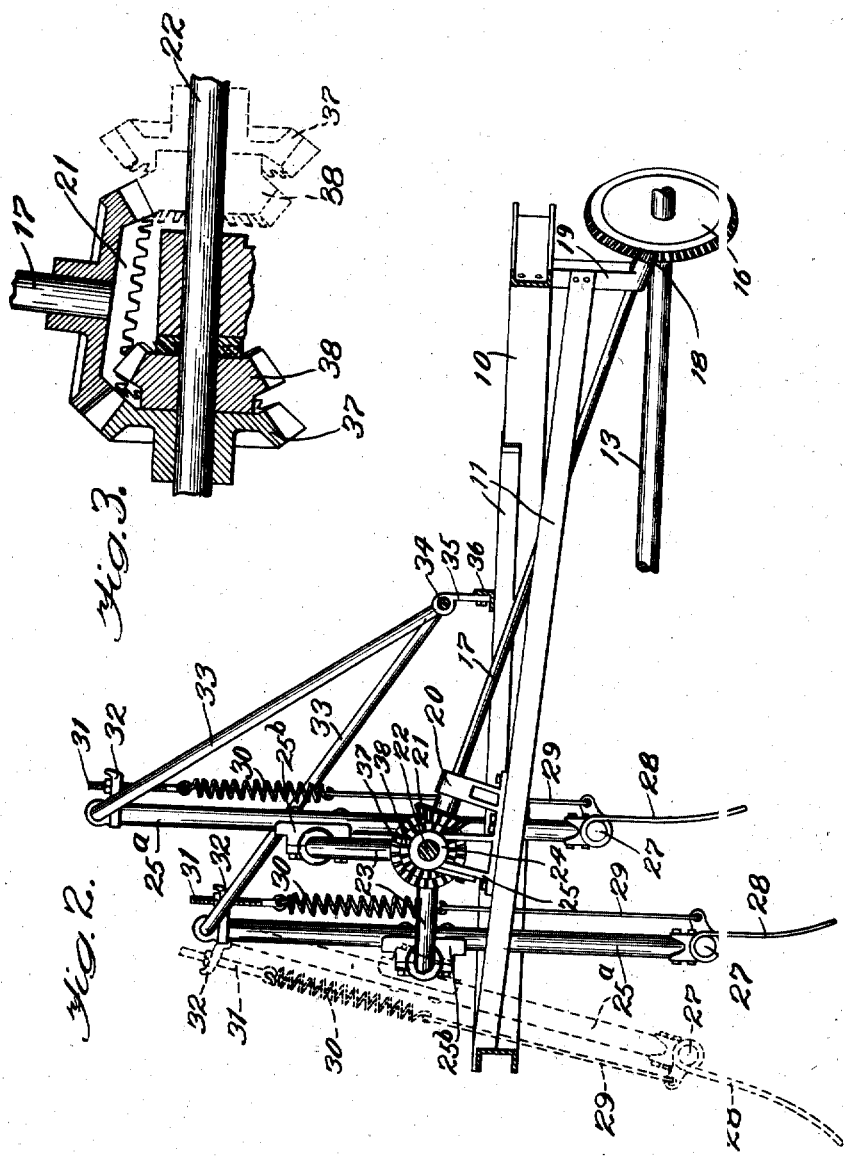

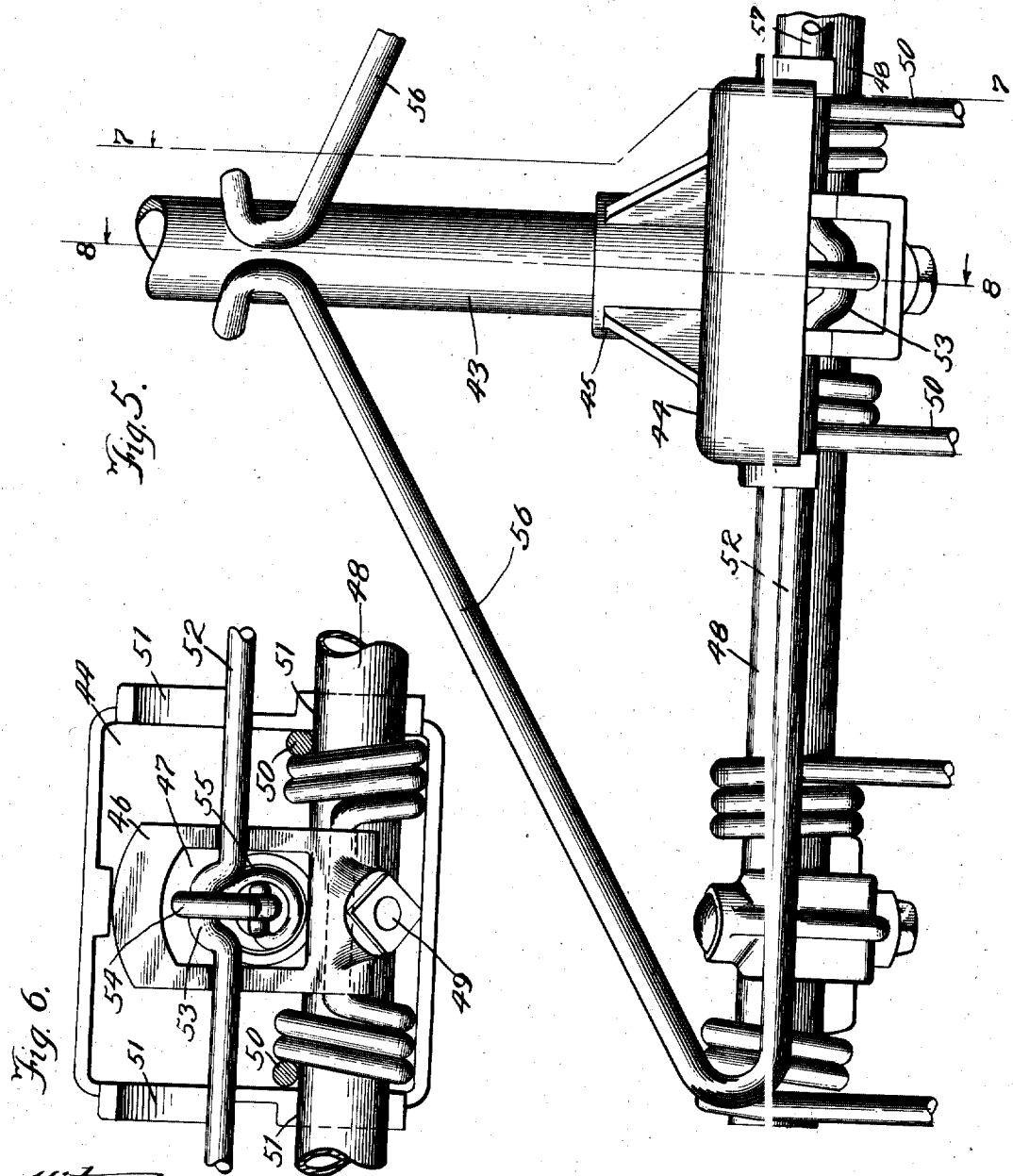

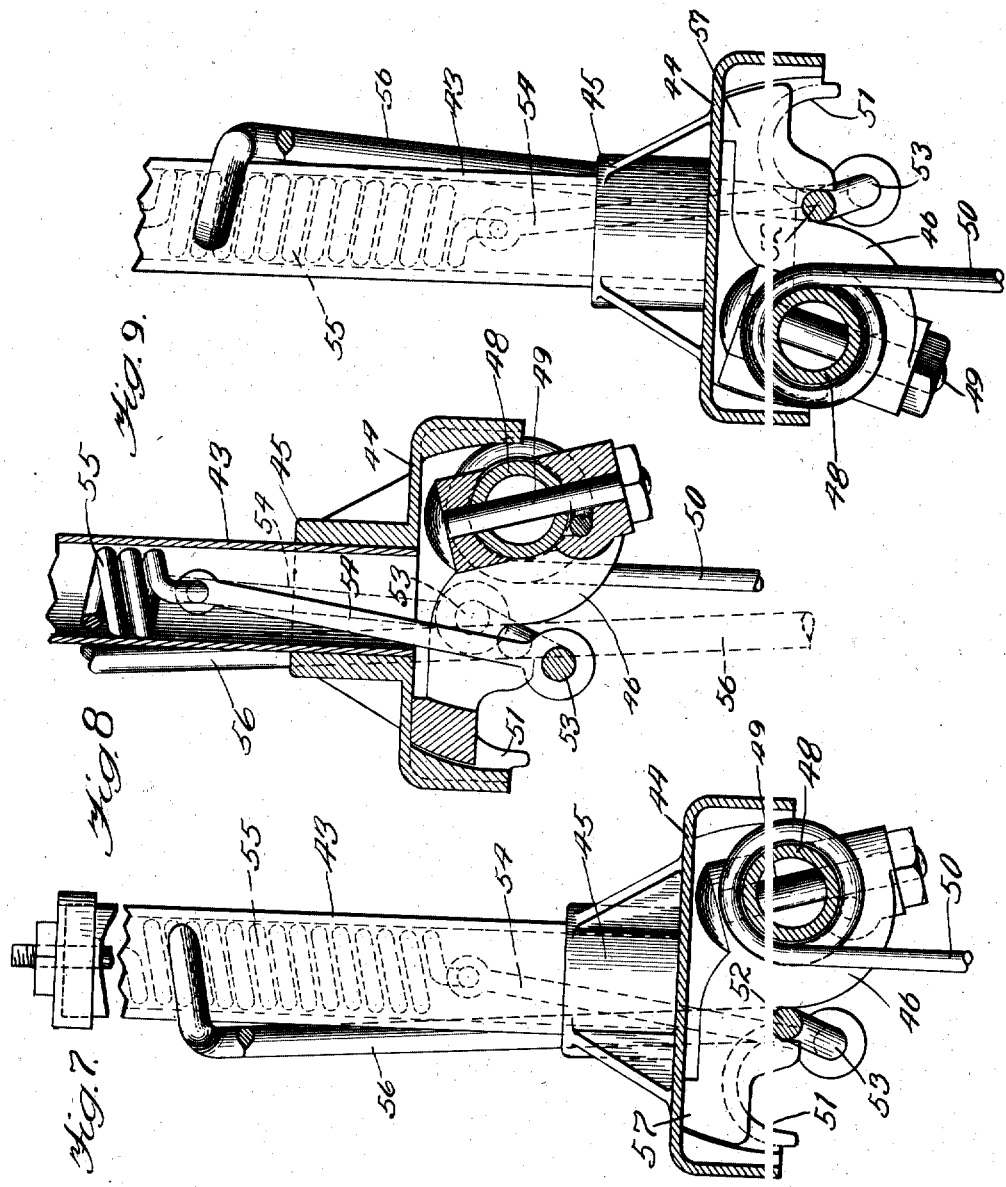

JOHN N. J. HILBERT, OF CHICAGO, ILLINOIS, ASSIGNOR TO CHAMBERS, BERING, QUINLAN COMPANY, OF DECATUR, ILLINOIS, A CORPORATION OF ILLINOIS.

COMBINED HAY RAKE AND TEDDER.

1,008,467. Specification of Letters Patent. Patented Nov. 14, 1911.

Continuation of application Serial No. 535,674, filed December 30, 1909. This application filed April 10, 1911. Serial No. 620,221.

*To all whom it may concern:*

Be it known that I, JOHN N. J. HILBERT, a citizen of the United States, residing at Chicago, in the county of Cook and State of Illinois, have invented certain new and useful Improvements in Combined Hay Rakes and Tedders, of which the following is a specification, reference being had to the accompanying drawings.

This invention relates to improvements in machines designed for use in the making and gathering of hay, and has for its leading object to produce a machine that can be quickly and easily converted from a hay-rake to a hay-tedder, or vice versa.

Another object is to provide, in connection with one form of the machine, new and improved means for permitting the ready reversal of the hay-forks accordingly as the machine is used for one purpose or the other and to hold such forks securely in either position.

That which I believe to be new will be pointed out in the claims.

In the accompanying drawings—Figure 1 is a top or plan view of my improved machine; Fig. 2 is a section taken at line 2—2 of Fig. 1, and showing in dotted lines the position assumed by one of the hay moving forks and its supporting arm when the machine is arranged for use as a tedder; Fig. 3 is an enlarged detail showing a portion of the drive-shaft, and the crank-shaft driven thereby, and showing the two bevel-gears that are carried by the crank-shaft, and also the bevel-gear carried by the drive-shaft in engagement with one of said crank-shaft gears. In dotted lines is also shown the engagement between the drive-shaft gear and the other gear on the crank-shaft when said crank-shaft is reversed end for end on the frame; Fig. 4 is a detail showing a modification whereby the machine may be changed from a hay-rake to a tedder, or vice versa, without having to reverse the crank-shaft end for end; Fig. 5 is an enlarged detail of a portion of one of the reversible forks that is employed when the machine is provided with gears as in Fig. 4; Fig. 6 is a bottom view of the central portion of one of the fork-heads, and the means for connecting it to its arm; Fig. 7 is a section taken at line 7—7 of Fig. 5; Fig. 8 is a vertical section taken at line 8—8 of Fig. 5; and Fig. 9 is a view similar to Fig. 7 but showing the fork-head adjusted to its other position.

Referring to the several figures of the drawings, in which corresponding parts are indicated by like reference numerals—10 indicates a frame which is approximately of triangular shape, as shown in Fig. 1. This frame is best constructed of a single piece of material bent or curved into proper shape and with the two ends suitably secured together. I preferably make the frame of ordinary channel-iron as shown by Fig. 2. The frame is braced at intervals by diagonally extending braces 11, and at its rear end there is a caster-wheel 12.

13 indicates an axle to which the front portion of the frame 10 is attached in any suitable manner. 14—14 indicate wheels mounted on the ends of said axle 13.

15 indicates a tongue secured to the front portion of the frame 10.

16 indicates a bevel-gear fast on the axle 13 near one of the wheels 14.

17 indicates a drive-shaft provided at its forward end with a small gear 18 that meshes with the bevel-gear 16. This drive-shaft extends diagonally toward the rear and, as shown in Fig. 2, also extends upward so that its rear end is above the plane of the frame 10 to adapt it to engage and drive, as hereinafter described, a shaft that extends across the frame 10 from side to side. The shaft 17 is supported in suitable bearings, one of which, indicated by 19, (see Fig. 2) depends from the front portion of the frame and the other, indicated by 20, is supported upon the frame.

21 indicates a bevel-gear secured upon the rear end of the drive-shaft 17.

22 indicates a crank-shaft the various cranks that are formed therewith being indicated by 23. This shaft extends across the frame 10 at an angle to the line of draft of the machine. It is supported in suitable bearings 24 formed in the upper ends of brackets 25, as best shown in Fig. 2. These brackets are supported by the frame 10, one of them, in the construction shown, being mounted directly upon one branch, or side, of the frame and the other being mounted upon the various brace members 11. These brackets are to be bolted in place so as to be readily removable to permit the crank-shaft 22 to be turned end for end for the purpose hereinafter set forth.

25ª indicates arms, one being attached to each crank-arm 23 in any suitable manner as for example by a block 25ᵇ bolted to the arm and having a bearing in which the crank can freely turn. The lower end of each arm is provided with a pivoted fork, the head of which is indicated by 27 and the teeth thereof by 28. To maintain the teeth in proper working position and yet permit the fork, as a whole, to yield when the teeth come in contact with an obstruction the rod 29 is suitably connected to each fork at one side of the pivot and extends up alongside of the arm 25ª that carries the fork. The upper end of each rod 29 is provided with a coiled spring 30 suitably secured through the intervention of a screw bolt 31, and bracket 32, or otherwise, to the upper end of such arm. The spring and rod act to normally hold the fork in operative position.

33 indicates rods, one for each arm 25ª, and each pivotally attached at its rear end to the upper end of an arm 25ª and at its forward end to a long rod 34 held in brackets 35. The several brackets 35 are secured to a cross-bar 36 extending across the frame 10 forward of, and parallel to, the crank-shaft 22. The rods 33 serve to maintain the arms 25ª at all times in working position, as will be readily understood.

37 and 38 indicate two bevel-gears arranged close to one another and each fast on the crank-shaft 22. These bevel-gears are of different diameters, 37 indicating the larger one, and each is adapted, under certain conditions about to be described, to mesh with the bevel-gear 21 that is carried on the rear end of the drive-shaft 17. As shown in Fig. 1 the drive-shaft 17 is so arranged as to always be slightly out of perpendicular with reference to the crank-shaft or, in other words, so arranged that the angles formed between it and the crank-shaft are unequal angles.

With the parts arranged as shown in Fig. 1, and in full lines in Figs. 2 and 3, the gear 21 on the drive-shaft 17, is in engagement with the larger gear 37 on the crank-shaft and when so arranged the machine is adapted for use as a hay-rake, because as the machine moves forward the crank-shaft will be so rotated as to compel a movement of the arms 25ª attached to the cranks of such shaft that they will move the hay, that the forks engage, forward and to one side so that it may be the more easily gathered. Now to turn and throw the hay for curing purposes, as by a tedder, the forks should be moved more rapidly over the ground so as to distribute the hay more evenly and, of course, should act to throw the hay away from and to the rear of the machine. I provide for this operation by the use of the same devices that have been described, but differently arranged. In rearranging the parts for this use the rods 33 are to be disconnected from the brackets 35 by withdrawing the long rod 34 and the brackets 25 are to be disconnected from their supports by withdrawing the bolts that hold them to such supports. The crank-shaft 22, with the said arms 25ª and their attached parts, and with the brackets 25 still remaining on said crank-shaft, is then lifted off of the frame and turned end for end, and again secured in place, and the forward ends of the rods 33 again pivoted in place by inserting the long rod 34 through the eyes in the brackets 35 and in said rods 33. Changing the crank-shaft end to end in this manner brings the small gear 38 into mesh with the gear 21 this being permitted by reason of the peculiar angular relation hereinbefore described that exists at all times between the drive-shaft and the crank-shaft. Furthermore as this small gear 38 is located at the opposite side of the drive-shaft 17 from that at which the other gear 37 was located when it was driven from said shaft it is obvious that the crank-shaft must be reversely rotated and hence must so operate the arms 25ª as to cause the fork-teeth 28 to throw the hay in a direction opposite to that in which it was thrown in the other arrangement of the parts, and the movement of the arms 25ª will necessarily be at a considerably greater speed than in such other arrangement owing to the smaller size of the said gear 38.

In Fig. 4 I have shown a modification in the means for accomplishing the driving of the crank-shaft in either direction and at different speeds, by the use of which modified form the necessity for the removal of the crank-shaft from the machine, and the turning of it end for end, as described, is obviated. In this construction of Fig. 4 the same drive-shaft 17 and crank-shaft 22 are employed, and arranged with relation to each other in exactly the manner specified and the end of the drive-shaft has secured to it the same bevel-gear 21. The change made from that described for Figs. 1, 2 and 3 consists in employing on the drive-shaft two bevel-gears of different sizes indicated, respectively, by 39—40 which correspond in size and function to the previously described gears 37—38, but differing from the gears 37—38 as to their location with reference to each other on the crank-shaft, and also being different in that they are slidingly mounted on such drive-shaft. As shown by said Fig. 4 these gears 39—40 are carried by short sleeves 41—42, respectively, said sleeves being adapted to be moved independent of each other along the shaft 22, whereby either one may be moved into or out of mesh with the bevel-gear 21 of the drive-shaft. These gears 39—40 are located, as shown, at opposite sides of the said drive-shaft 17, and, therefore, accordingly as one or the other is in mesh with the drive-shaft gear the crank-shaft will be turned in one direction or the other so as to have the machine perform the office of either a hay-rake or a hay-tedder as desired. The sleeves that carry the two sliding gears can be locked in position on the crank-shaft by bolts, as indicated, or secured thereto in any other suitable manner.

The fork-teeth employed in machines of this character are slightly bowed or curved to better adapt them to engage the hay on the ground, and while it is evident that these curved teeth will be properly presented to the hay to be operated upon at all times when the crank-shaft is turned end for end, as described, yet such will not be the case when the machine is changed from a hay-rake to a hay-tedder, or vice versa, by the sliding gearing shown in Fig. 4. It, therefore, becomes necessary when shifting a machine that employs the mechanism of Fig. 4 from one use to the other to arrange for also reversing the direction in which the curved fork-teeth face. I accomplish this by the means shown in Figs. 5 to 7, inclusive, in which a portion of one fork, and its arm, are illustrated. The fork arm in these figures is indicated by 43 and is in the form of a pipe or tube. 44 indicates a large rectangular plate provided on its upper face with a socket 45 in which is suitably secured the lower end of fork arm 43. As shown this plate 44 is formed with a wide downwardly turned flange so as to form in effect an inverted receptacle-like device. 46 indicates a block located beneath the plate 44 and held, as hereinafter described, against the under face of such plate. The block is provided, as best shown in Fig. 6, with a large central opening through it, which is indicated by 47, said opening lying directly below the open lower end of the fork arm 43, as shown in Fig. 8. This block 46 extends from near the front flange to the rear flange of plate 44 and at one end is much thicker that at the other, and in this thicker end it is provided with a suitably shaped seating portion adapted to receive a cylindrical tube or bar 48 that constitutes the head of the raking fork. The head 48 is secured in the block by a suitable bolt 49. The block also secures the central one of the several pairs of rake-teeth 50, the other pairs of such rake-teeth being secured to the head by suitable clips as usual. When the fork-head is connected to the block 46, and such block is in position beneath the plate 44, the fork-head will lie in a pair of alined bearings formed in the opposite side flanges of the plate 44. Two pairs of such alined bearings are shown, each bearing being indicated by the numeral 51. 52 indicates a heavy cylindrical rod located a short distance from the cylindrical fork-head 48, and extending parallel to such fork-head. This rod 52 passes beneath the block 46, the under face of said block, at its sides, being recessed, as clearly shown in Figs. 7, 8 and 9 to receive said rod. That portion of the rod between the recesses referred to is bent to form a crank 53 and to this crank is attached the lower end of a link 54 that extends up through the central opening 47 in the block 46 into the lower portion of the fork-arm 43, the upper end of said link being secured to a coiled spring 55. The upper end of this spring is suitably connected with a cap on the upper end of the arm 43, as indicated in Fig. 7, or otherwise suitably and firmly attached in place. When the parts are in working position the spring 55 will be under tension just sufficient to hold the block firmly in place against the plate and it is evident that if the rod 52 be axially turned so as to throw its crank portion 53 up, as indicated in dotted lines in Fig. 8, the pull of the spring will be so taken off from the block as to permit the block and its attached fork to be readily pulled down sufficiently to clear the edge of the flange on the plate 44 and when so pulled down it can be turned end for end so as to bring the fork-head 48 in position to be received in the other pair of bearings 51, which reversal in position, of course, faces the curved teeth of the fork in the opposite direction from which they had theretofore been—the two positions of the block, and the fork carried thereby, being shown respectively in Figs 7 and 9. In order to provide means for axially turning the rod 52 such rod is made very considerably longer than the fork-head and near each end of the fork-head the rod is bent (see Fig. 5) to form two diagonal arms 56 whose ends are so bent as to partially embrace and engage the fork-arm 43. Such engagement is sufficiently strong to hold the rod 52 against accidental turning, but when it is desired to so turn the rod, as above explained, the diagonal arms 56 can be readily sprung out of engagement with the fork-arm and be used as handles or levers for rotating the rod 52. Such arms 56 when swung completely down to throw the crank portion 53 to its uppermost position and thus enable the block to be shifted as before described with the least effort will be substantially in the position shown by the dotted lines in Fig. 8. After the block has been reversed in position the diagonal arms 56 are to be again thrown up and engage, as before, with the fork-arm 43, but, of course, at the opposite side of such fork-arm as will be understood from an examination of Figs. 7 and 9. When the parts are in operative position the block 46 will be held seated on the cylindrical rod 52 and will bear firmly at that end opposite to the end that carries the fork-head against the underface of the plate 44,—the block at such bearing end being provided with a wide bearing face or stop 57. It is evident that if the fork-teeth meet any unusual obstruction the block as a whole can yield as it will tend to rock on said cylindrical rod 52 as on a pivot and at the same time pulling down through the link 54 on the coiled spring 55. Immediately upon passing the obstruction the tension of the spring will instantly return the block to its normal position.

What I claim as my invention, and desire to secure by Letters Patent, is—

1. In a machine of the class described, the combination with a frame, of a reversible crank-shaft supported thereby, means whereby said shaft may be supported in either adjusted position, arms connected with the cranks of said shaft, forks on the lower ends of said arms, and means comprising different sized gears for driving said shaft at different speeds according to its arrangement with respect to the frame.

2. In a machine of the class described, the combination with a frame, of a crank-shaft supported thereby, arms connected with the cranks of said shaft, forks on the lower ends of said arms, and means for causing said forks to move over the ground in one direction or the other and at different speeds according to the direction in which they move, said means comprising a drive-shaft extending from the front portion of the machine back toward the crank-shaft, two gears on one of said shafts, a gear on the other of said shafts adapted to mesh with either of said first-mentioned gears, and means for driving said drive-shaft.

3. In a machine of the class described, the combination with a frame, of a reversible crank-shaft, means whereby said shaft may be supported in either adjusted position, arms connected with the cranks of said shaft, forks on the lower ends of said arms, a plurality of gears of different sizes on said reversible crank-shaft, and means for driving said crank-shaft through either of said gears.

4. In a machine of the class described, the combination with a frame of a reversible crank-shaft supported thereby, means whereby said shaft may be supported in either adjusted position, arms connected with the cranks on said shaft, forks on the lower ends of said arms, a drive-shaft extending from the front portion of the machine back toward the crank-shaft, a gear on the rear end of said drive-shaft, a plurality of gears on the crank-shaft with either of which the said drive-shaft gear is adapted to mesh, and means for driving said drive-shaft.

5. In a machine of the class described, the combination with a frame, of a reversible crank-shaft supported thereby, means whereby said shaft may be supported in either adjusted position, arms connected with the cranks on said shaft, forks on the lower ends of said arms, a drive-shaft extending from the front portion of the machine back toward the crank-shaft, a gear on the rear end of said drive-shaft, a plurality of gears of different sizes on the crank-shaft with either of which the said drive-shaft gear is adapted to mesh, and means for driving said drive-shaft.

6. In a machine of the class described, the combination with a frame, of a crank-shaft supported thereby, arms connected with the cranks of said shaft, forks on the lower ends of said arms, a drive-shaft extending from the front portion of the machine back toward the crank-shaft, a gear on said drive-shaft, a plurality of gears on the crank-shaft, with either of which said drive-shaft gear is adapted to mesh, and means for driving said drive-shaft.

7. In a machine of the class described, the combination with a frame, of a crank-shaft supported thereby, arms connected with the cranks of said shaft, forks on the lower ends of said arms, and means for causing said forks to move over the ground in one direction or the other and at different speeds according to the direction in which they move, said means comprising two different sized gears on said crank-shaft and a shaft provided with a gear that is adapted to mesh with either of the gears on the crank-shaft.

8. In a machine of the class described, the combination with a frame, of a crank-shaft supported thereby and adapted to be reversed end for end, arms connected with the cranks of said shaft, forks on the lower ends of said arms, a drive-shaft, means for driving the same, said drive-shaft extending toward said crank-shaft in such manner that the angles formed by it with said crank-shaft are unequal, a gear on that end of the drive-shaft adjacent to the crank-shaft, and two gears on the crank-shaft, one adapted to mesh with the gear on the drive-shaft when the crank-shaft is arranged with respect to the frame in one position and the other adapted to mesh with it when the crank-shaft is reversed end for end.

9. In a machine of the class described, the combination with a frame, of a crank-shaft supported thereby, arms connected with the cranks of said shaft, forks on the lower ends of said arms, a drive-shaft, means for driving the same, said drive-shaft extending toward such crank-shaft in such manner that the angles formed by it with said crank-shaft are unequal, a gear on that end of the drive shaft adjacent to the crank-shaft, and two different sized gears on the crank-shaft either of which is adapted to mesh with the gear on the drive-shaft.

10. In a machine of the class described, the combination with a frame, of a reversible crank-shaft supported thereby, means whereby said shaft may be supported in either adjusted position, arms connected with the cranks of said shaft, forks on the lower ends of said arms, rods pivotally connected to the upper ends of said arms, and a rod extending across the frame of the machine in front of said crank-shaft and pivotally supporting said first-mentioned rods, said rod being movably supported on said frame.

JOHN N. J. HILBERT.

Witnesses:
W. H. DE BUSK,
W. A. FURNNER.

Copies of this patent may be obtained for five cents each, by addressing the "Commissioner of Patents Washington, D. C."